A. GILLIES.
METHOD FOR PULSATING TEAT CUPS.
APPLICATION FILED NOV. 11, 1907.
918,438.
Patented Apr. 13, 1909.
2 SHEETS—SHEET 1.
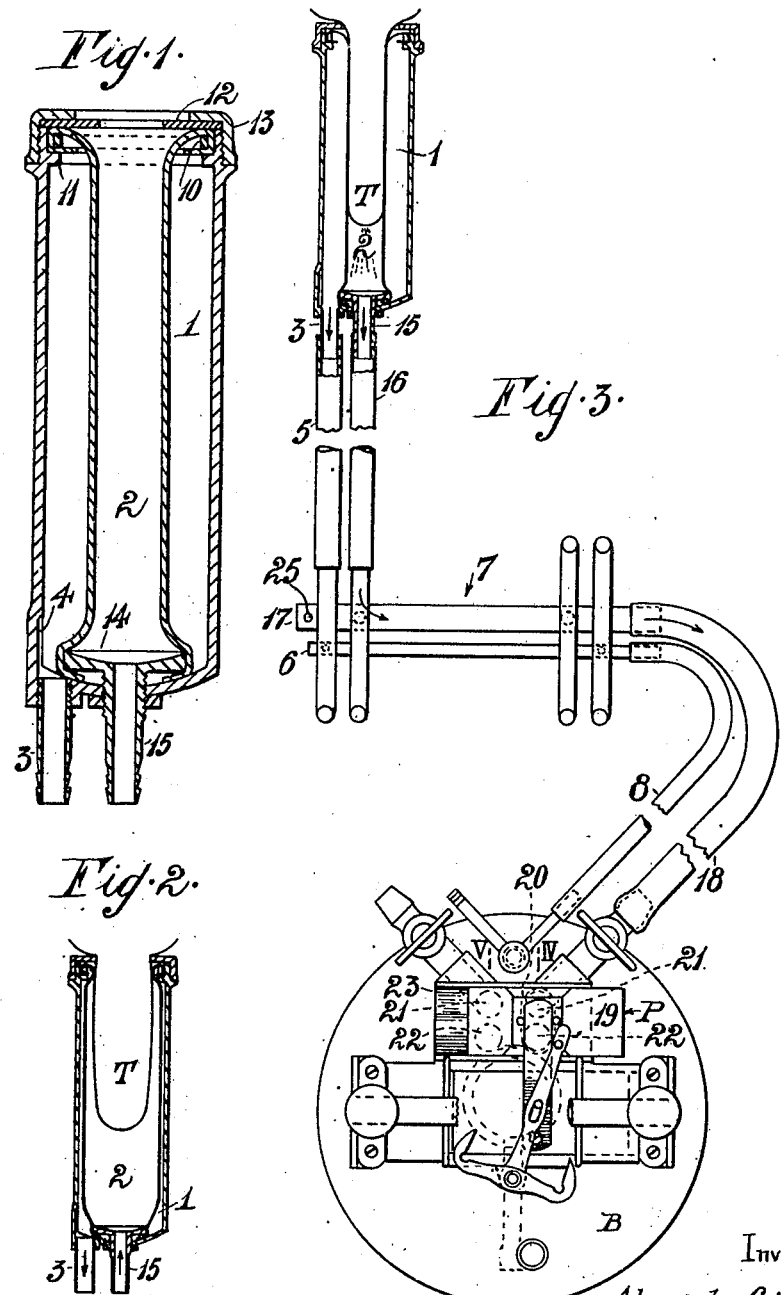
Witnesses
William G. Holder
Percy Johnston
Inventor
Alexander Gillies
By
Edw. Waters & Sons
Attorneys

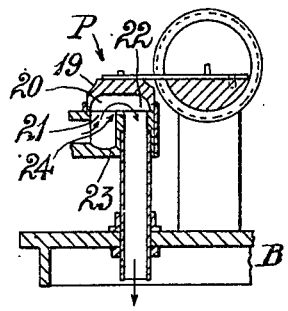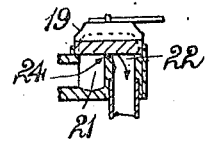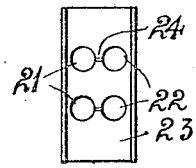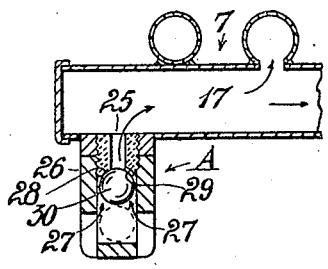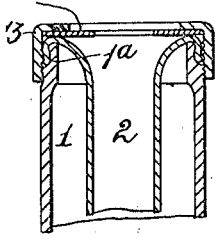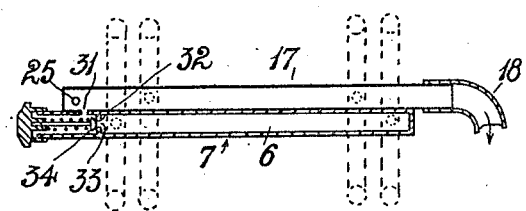

UNITED STATES PATENT OFFICE.

ALEXANDER GILLIES, OF HEIDELBERG, VICTORIA, AUSTRALIA.

METHOD FOR PULSATING TEAT-CUPS.

No. 918,438.  Specification of Letters Patent.  Patented April 13, 1909.

Application filed November 11, 1907. Serial No. 401,739.

*To all whom it may concern:*

Be it known that I, ALEXANDER GILLIES, a subject of the King of Great Britain, residing at No. 2 Brown street, Heidelberg, in the State of Victoria, Australia, dairyman, have invented an Improved Method of Pulsating Teat-Cups, of which the following is a specification.

This invention relates to an improved method of creating pulsations within double chambered teat cups for the purpose of causing the milk to be drawn from the teats in a natural manner without injury or pain to the animal, and with a material reduction of power.

Hitherto with pulsating methods it has been the custom to effect an alternate suction and air pressure between the outer casing or outer chamber and inner lining or inner chamber of the teat cup, but according to this invention a constant and uninterrupted suction is maintained therein by which means the inner chamber first distends outwardly thus allowing the teat to fill naturally and is then restored to its normal shape so as to squeeze the teat and cause the milk to flow freely along the milk way. With this method the point of the teat is permanently free and the pressure of the inner lining around the sides of the teat, aided by the suction within said lining allows the point of the teat to open freely and discharge its milk.

In conjunction with the constant suction in the outer chamber an alternating variable degree of suction is effected within the inner chamber by means of temporarily either entirely or only substantially cutting off the connection between the source of suction power and the "milk way" and at the same time permitting atmospheric air to enter the latter. By this method when the inner chamber is distended the suction is temporarily reduced so that the teat is not distended as heretofore but merely fills naturally and consequently is not subjected to any strain, while when the suction is again admitted within the inner chamber its pressure is about equal to that in the outer chamber and consequently said inner chamber resumes its natural shape thus embracing the teat, but does not press inwardly below the point.

The degree of suction within the inner chamber may be broken down from the maximum to *nil* when suitable means are provided for holding the cups on the teat, but when the suction is relied upon for this purpose it is not desirable to reduce the pressure to such a degree.

Another advantage is that the cup will remain in position on the teat and is moreover usable for teats of variable size without requiring adjustment.

The milk drive is obtained by admitting a small quantity of air to the interior of the inner chamber. The intermittent suction in the milk way is effected by intermittingly connecting same with the suction power by means of valves, cocks, or the like operated by any suitable mechanism, and as it is only necessary to overcome the small quantity of air admitted into the milk way it will be apparent that this may be effected with a minimum of power and consequently expensive and excessive machinery hitherto used in milking plants are unnecessary. This is a distinct advantage over known pulsating devices as the intermittent admission of air pressure into the outer chamber necessitated a considerable amount of power to afterward remove it in order to produce the alternate suction.

With this invention when the suction is in communication with the inner chamber the small quantity of air admitted into the "milk way" merely assists the discharge of the milk which is flowing from the teat at this time and does not appreciably affect the degree of suction, but when the suction is temporarily cut off or substantially so from the inner chamber, the air admitted at once reduces the degree of suction within the inner chamber thus relieving the strain on the teat and allowing the inner lining to distend as before stated.

In this specification the words "milk way" are intended to include the mouthpiece, the inner chamber of cup, the tubes to the milk passage of the claw, the milk passage of the claw, and the tube leading therefrom to the receiver.

The accompanying drawings forming part of this specification are intended to show one form of apparatus that is suitable for effecting the method set forth, but it is to be clearly understood that such apparatus is not essential and that other forms thereof would be equally applicable.

Figure 1 is an enlarged vertical section of a double chambered teat cup. Fig. 2 a similar view drawn to a reduced scale showing the inner chamber distended. Fig. 3 a plan (broken) of the pulsating apparatus showing only one cup and that in vertical section with the inner chamber restored to its normal shape. Fig. 4 a vertical section of the cut off valve taken on line IV, Fig. 3, and Fig. 5 a similar view on line V of said figure. Fig. 6 plan of the valve seat. Fig. 7 an enlarged vertical section illustrating the air inlet valve. Fig. 8 a horizontal section through the claw as constructed for this method of pulsation when only a single tube is employed for delivering the suction power to the teat cups, and Fig. 9 a sectional view of a modified form of cup (broken).

The apparatus for effecting this method comprises an outer chamber 1 inclosing a rubber or like flexible inner chamber 2, which receives the teat T. The outer chamber is provided at the bottom with a short pipe 3 and is preferably formed with a vertical groove or passage 4 in its interior which communicates with said pipe and prevents same being closed. A tube 5 connects said pipe with the common suction passage 6 of the claw 7, and said passage is connected by a tube 8 with the suction power and preferably with the milk bucket B in which a constant vacuum is maintained so that a constant suction is maintained within the outer chamber of the cup, that is around the inner chamber 2, which thus tends to exert a distending power thereupon. The upper edge of the rubber forming the inner chamber is passed through and turned over a metal or other solid ring 10, which is seated upon an internal shoulder 11 formed on the outer chamber near its upper end. The constant suction within said outer chamber draws the upper edge of the rubber and the ring hard down on said shoulder and thus makes an air-tight joint and closes the top of the outer chamber. A rubber washer 12 is also preferably placed above the mouth of the inner chamber for the purpose of holding the cup to the teat and said washer is secured in position by means of a mouthpiece 13 screwed on the upper end of the outer chamber. The edge of the lining may also be drawn over a reduced neck 1ª on the outer casing and be secured by the mouthpiece. The lower edge of the inner chamber is turned around the cup-shaped head 14 of a short pipe 15 passing through and secured to the bottom of the outer chamber, which construction insures a tight-joint. The short pipe 15 discharges the milk into a tube 16 connecting said pipe with the common milk passage 17 of the claw and a tube 18 connects said milk passage with the suction in the milk bucket B. The suction is substantially cut off intermittingly from this tube and the whole of the "milk-way" by means of any suitable valve cock or the like P operated either mechanically or pneumatically. One suitable device for this purpose is shown in Figs. 3, 4, 5, and 6, and consists of a slide valve 19 provided with a passage 20, and adapted to be reciprocated across pairs of ports 21, 22, in a valve seat 23 one 21 of each pair of said ports being in communication with the tube 18 of the "milk-way", and the other 22 of each pair with the suction of the milk bucket B.

Although this method of pulsating acts efficiently by completely disconnecting the ports at intervals it is found advantageous to permanently connect each pair of ports by a very minute passage 24 in order to insure sufficient suction to prevent the backward surging of any milk in the tube when the suction therein is reduced as hereinafter explained, hence the reason for only "substantially" cutting off the suction power from the "milk-way."

At a convenient point in the "milk-way", for instance in the milk passage of the claw is provided an atmospheric air inlet 25, the area or opening of which may be either fixed as in Fig. 3, or intermittingly varied by means of an automatic valve A, Fig. 7. This latter consists of a small chamber 26 attached to the underside of the milk passage 17 of the claw, which is provided with one or more openings 27 in the bottom and with a valve seat 28 at the top having a central hole or inlet 25 in communication with said milk passage, which seat is furthermore provided with a comparatively narrow slit or port 29 by means of which the milk passage is in permanent communication with the atmospheric air pressure. Within said chamber is a loose valve such as a ball 30, which is drawn up against its seat by the suction when the milk is flowing thus closing the air inlet 25 so that only a small quantity of air is admitted through the port 29 to assist the flow of milk. By the alternate pulsating action i. e. when the suction is substantially cut off, the valve drops and a comparatively large quantity of air is admitted through the inlet 25 to reduce the suction in the inner chamber of the cup. The air which enters this inlet and traverses the whole of the "milk-way" has therefore a two-fold effect viz:—to reduce the suction within the inner chamber when the suction is temporarily substantially cut off by the valve P from the milk bucket during the relaxation of the teat and also to assist the flow of milk when same is being squeezed from the teat by the inner chamber. It will thus be apparent that when the "milk-way" including the inner chamber is again connected with the suction by the valve P, it is only necessary to overcome the small quantity of air introduced through said air inlet 25 in order to restore the maximum pressure again and this may be effected with a minimum of power.

The method of pulsating by the above described means is as follows:—When the suction in the "milk-way" is temporarily substantially cut off by the valve P as in Figs. 2 and 5 the air admitted through the inlet 25 in the claw greatly reduces the suction within the inner chamber 2 so that the teat is relieved from strain, while the constant suction in the outer chamber 1 distends said inner chamber outwardly from the teat, thus enabling the latter to fill with milk as in Fig. 2. The valve P then operates to again restore the suction in the "milk-way" and inner chamber 2 so that the latter by reason of the approximately equal pressures on either side resumes its normal shape and draws firmly around the teat and extends same downwardly without covering the point thereof (Fig. 3). The milk is thus drawn in the most natural way from the teat and aided by the minute quantity of air which enters the "milk-way" is driven freely into the milk bucket.

This method of pulsating is equally effective with milking apparatus having either a single or double tube for conveying the suction to the teat cups. Fig. 8 illustrates the single tube arrangement, and it will be seen by reference thereto that the common suction passage 6 of the claw 7 is closed at one end and is in communication with the milk passage by a port 31, while within said suction passage is a seating 32 having a central opening 33, which is normally closed by a spring operated non-return valve 34 adjustably fitted in the end of the passage 6. By this means when the maximum suction is in the inner chamber 2, the valve 34 is lifted off its seating and so places the milk and suction passages in communication by means of the opening 33 and port 31, and when the suction is reduced in said inner chamber the valve returns and closes said opening 33 thus retaining the suction within the outer chamber 1.

Having now particularly described and ascertained the nature of my said invention and in what manner the same is to be performed, I declare that what I claim is;—

1. Improved method of pulsating double chambered teat cups of pneumatic milking machines consisting in maintaining a constant suction in the outer chamber, and an intermittent suction in the inner chamber for the purposes set forth.

2. Improved method of pulsating double chambered teat cups of pneumatic milking machines consisting in maintaining a constant suction in the outer chamber, and a variable suction in the inner chamber for the purposes set forth.

3. Improved method of pulsating double chambered teat cups of pneumatic milking machines consisting in maintaining a constant suction in the outer chamber, and substantially cutting off the suction in the inner chamber intermittingly, and when so cut off introducing air to temporarily substantially reduce the suction therein substantially as set forth.

4. Improved method of pulsating double chambered teat cups of pneumatic milking machines consisting in maintaining a constant suction in the outer chamber, a variable admission of air to the inner chamber and a suction in said inner chamber adapted to be substantially cut off at intervals substantially as set forth.

5. Improved method of pulsating double chambered teat cups of pneumatic milking machines consisting in producing a constant suction in the outer chamber, and in the inner chamber a suction of approximately equal power adapted to be intermittingly reduced for the purpose set forth.

6. Improved method of pulsating double chambered teat cups of pneumatic milking machines consisting in producing simultaneously a suction in the outer chamber and atmospheric pressure within the inner chamber to distend the latter and subsequently maintaining the suction in the outer chamber and producing a suction of approximately equal power in the inner chamber to restore the latter to its normal shape substantially as set forth.

7. The method of pulsating double-chambered teat-cups of pneumatic milking machines, consisting in maintaining constant suction in the outer chamber of each cup, an intermittent suction in the inner chamber, and introducing air in the latter chamber when the suction is substantially cut off therefrom to temporarily reduce the suction therein.

In testimony whereof I have hereunto set my hand in presence of two subscribing witnesses.

ALEXANDER GILLIES.

Witnesses:
 EDWARD WATERS,
 EDWARD NEEDHAM WATERS.